April 8, 1924.
W. G. BUSH
FOOT ACCELERATOR
Filed Jan. 8, 1923
1,489,482
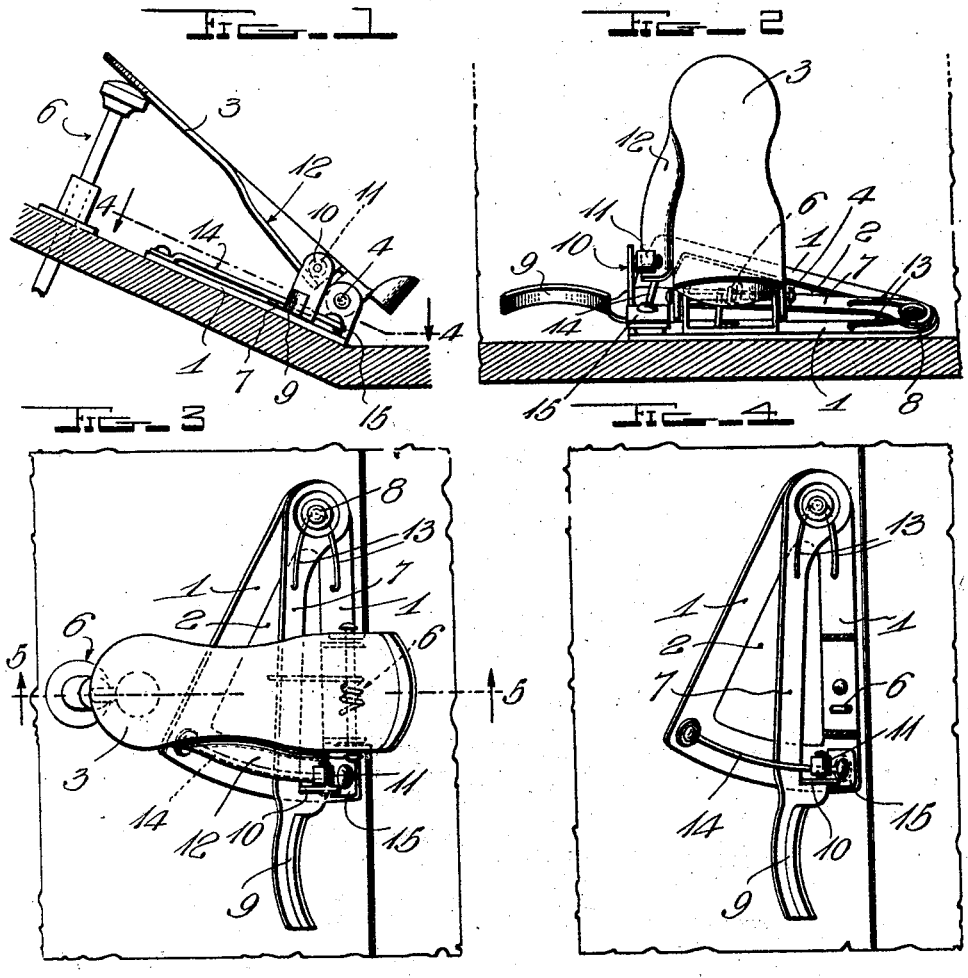
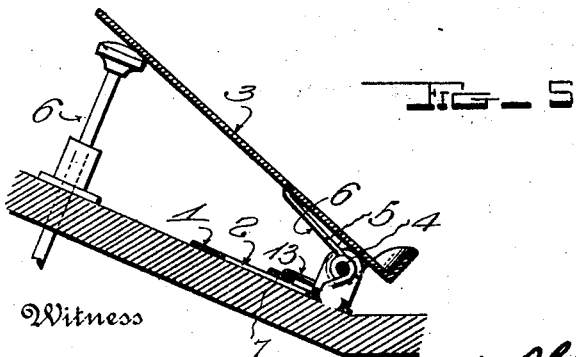
Inventor
W. G. Bush
By H. B. Wilson Yeo
Attorneys
Witness Patented Apr. 8, 1924.

1,489,482

UNITED STATES PATENT OFFICE.

WALTER G. BUSH, OF POUGHKEEPSIE, NEW YORK.

FOOT ACCELERATOR.

Application filed January 8, 1923. Serial No. 611,381.

*To all whom it may concern:*

Be it known that I, WALTER G. BUSH, a citizen of the United States, residing at Poughkeepsie, in the county of Dutchess and State of New York, have invented certain new and useful Improvements in Foot Accelerators; and I do declare the following to be a full, clear, and exact description of the invention, such as will enable others skilled in the art to which it appertains to make and use the same.

My invention relates to improvements in foot accelerators for motor vehicles and has for one of its objects to provide an accelerator which may be operated while the driver's foot rests flat upon the floor, thereby overcoming the difficulty now experienced in holding the foot steadily upon the accelerator while driving over rough roadways.

Another object is to provide an accelerator which may be operated by vertical movement of the operator's foot as well as by sliding the foot upon the floor.

Yet another object is to provide a device of the class set forth which may be easily and inexpensively manufactured and may be readily applied to numerous forms of automobiles.

With the foregoing in view, the invention resides in the novel subject matter hereinafter described and claimed, the description being supplemented by the accompanying drawing.

Figure 1 is a side elevation of my invention attached to the floor of an automobile.

Figure 2 is a rear elevation.

Figure 3 is a top plan view.

Figure 4 is a horizontal sectional view as indicated by line 4—4 of Fig. 1.

Figure 5 is a longitudinal section as indicated by lines 5—5 of Fig. 3.

In the drawings above briefly described, the numeral 1 designates an attaching plate which is preferably of segmental shape and provided with a cutaway center 2 for the sake of lightness and inexpensive manufacture. A vertically movable foot plate or pedal 3 is pivotally mounted at 4 upon the rear edge of the plate 1 and any suitable spring, such as that indicated at 5, may be used for normally raising said plate. The front end of the plate is adapted to rest upon a vertically movable throttle-controlling device 6 which may well be the usual foot accelerator with which automobiles are now commonly provided. When operating a machine equipped with the invention upon a smooth roadway, the operator's foot may be used upon the pedal 3 for controlling the throttle, but on rough highways, this is undesirable as it is a physical impossibility to hold the foot entirely rigid and hence the gas supply to the engine is alternately increased and decreased with the shaking of the machine, which is very detrimental to all transmission and motor parts. Hence, I make provision for operating the pedal 3 by sliding the foot along the floor.

In the present showing, a horizontally swingable arm 7 has one end pivoted to the attaching plate 1 as indicated at 8, while its opposite end is preferably curved as indicated at 9 for engagement with the toe of the operator's shoe. The last mentioned end of the arm 7 is provided with an upstanding arm 10 carrying a roller 11 or other form of shoe which rests upon the upper side of an inclined cam 12 with which one edge of the foot plate or pedal 3 is provided. It will thus be seen that by swinging the arm 7 forwardly by sliding the foot along the floor of the machine, the co-acting cam and shoe will cause depression of the pedal 3 to actuate the throttle controlling device 6. During this operation, the driver's foot rests flat upon the floor and thus he can steadily hold the accelerator to effect a steady feeding of gas to the motor. By pushing the foot forwardly, the arm 9 is operated to increase the speed of the motor and I have shown an appropriate spring 13 for returning said arm when the foot pressure is released to decrease the motor speed.

As the downward pull of the roller 11 upon the cam 12 has a tendency to spring the free end of the arm 7 upwardly from the attaching plate 1, I prefer to provide said plate with a suitable guard 14 extending over said arm. At one end of this guard, I may well secure a suitable stop 15 for limiting the return movement of the arm 7 and preventing disengagement of the roller 11 from the cam 12. It will be understood however that other provision could be made for obtaining this result.

From the foregoing, taken in connection with the accompanying drawing, it will be seen that I have provided a simple and inexpensive device, yet one which is highly desirable and will permit acceleration of the motor either by vertical movement of the foot or by horizontal sliding thereof, as road conditions may dictate. As excellent results may be obtained from the details disclosed, these details may be followed if desired, but within the scope of the invention as claimed, numerous minor changes may be made. Furthermore, although I have disclosed the invention mounted upon the inclined foot-board of an automobile floor, it might well be positioned on the horizontal part of the floor if desired.

I claim:

1. A foot accelerator comprising a vertically movable pedal, a horizontally movable foot-controlled actuator, and means for operating said pedal from said actuator and for permitting operation of said pedal by pressure applied directly thereto.

2. A foot accelerator comprising a vertically movable pedal having an inclined cam, and a horizontally movable foot controlled actuator for said pedal having a portion engaging the upper side of said cam, the cam being movable away from said portion of the actuator when said pedal is depressed by pressure applied directly thereto.

3. A foot accelerator comprising a vertically movable throttle controlling pedal having an inclined cam, and a horizontally movable supplementary actuator adapted to be engaged by the operator's foot, said actuator carrying a shoe engaging said cam for depressing said pedal when the actuator is moved forwardly.

4. A foot accelerator comprising a base plate, a spring-raised throttle-controlling plate pivoted to said base plate and having a cam, and a horizontally swinging foot-operated spring-returned arm pivoted to said base plate and extending transversely beneath said pivoted plate, said arm having a shoe engaging the upper side of said cam.

5. A foot accelerator comprising a base plate, a spring-raised pedal pivoted thereto and adapted to engage a throttle control device, a horizontally swinging supplemental actuating arm pivoted to said base plate and extending beneath said pedal, the free end of said arm being shaped to form a toe-piece against which the operator's foot is placed, spring means for maintaining said arm normally inoperative, a guide on said base plate with which said arm co-operates, and a roller carried by said arm and engageable with said pedal for depressing it when said arm is moved forwardly.

In testimony whereof I have hereunto affixed my signature.

WALTER G. BUSH.